United States Patent [19]

Wiedemer

[11] Patent Number: 4,908,834
[45] Date of Patent: Mar. 13, 1990

[54] HIGH SECURITY PAY TELEVISION SYSTEM

[76] Inventor: John D. Wiedemer, c/o Signal Security Technologies, 1127 Texas Bank & Trust Tower, 6161 Savoy Dr., Houston, Tex. 77036

[21] Appl. No.: 100,577

[22] Filed: Sep. 22, 1987

Related U.S. Application Data

[63] Continuation-in-part of Ser. No. 660,512, Oct. 12, 1984, Pat. No. 4,696,034.

[51] Int. Cl.⁴ .............................................. H04N 7/167
[52] U.S. Cl. .......................................... 380/5; 380/7; 380/16; 380/20; 380/15
[58] Field of Search ...................... 380/5, 7, 10, 15, 16, 380/20, 22, 23; 358/86, 84; 455/3

[56] References Cited

U.S. PATENT DOCUMENTS

| | | |
|---|---|---|
| 3,538,243 | 0/0000 | Shanahan et al. . |
| 3,736,369 | 5/1973 | Vogelman et al. ...................... 380/7 |
| 4,068,264 | 1/1978 | Pires . |
| 4,081,832 | 3/1978 | Sherman . |
| 4,091,417 | 5/1978 | Nieson . |
| 4,163,254 | 7/1979 | Block et al. . |
| 4,163,255 | 7/1979 | Pires . |
| 4,222,068 | 9/1980 | Thompson ............................. 380/15 |
| 4,225,884 | 9/1980 | Block et al. . |
| 4,250,524 | 2/1981 | Tomizawa . |
| 4,338,628 | 7/1982 | Payne et al. . |
| 4,354,201 | 10/1982 | Sechet et al. . |
| 4,369,462 | 1/1983 | Tomizawa et al. . |
| 4,396,947 | 8/1983 | Cheung . |
| 4,417,101 | 11/1983 | Serres et al. . |
| 4,424,532 | 1/1984 | den Toonder et al. ................ 380/15 |
| 4,460,922 | 7/1984 | Ensinger et al. . |
| 4,484,027 | 11/1984 | Lee et al. . |
| 4,494,143 | 1/1985 | Lovick et al. . |
| 4,503,462 | 3/1985 | Kelley et al. . |
| 4,528,588 | 7/1985 | Löfberg . |
| 4,531,020 | 7/1985 | Wechselberger et al. . |
| 4,536,791 | 8/1985 | Campbell et al. . |
| 4,599,647 | 7/1986 | George et al. . |
| 4,696,034 | 9/1987 | Wiedemer ............................. 380/16 |

*Primary Examiner*—Thomas H. Tarcza
*Assistant Examiner*—Linda J. Wallace
*Attorney, Agent, or Firm*—Quarles & Brady

[57] ABSTRACT

A high security pay television system is provided in which television receivers include a decoder and with periodically changed removable memory modules. The decoder only functions to properly descramble the scrambled broadcase signal when a changeable system-wide code is available in the decoder. The code can either be carried in the memory module, or an internal code unique to the decoder and resident in the decoder can be combined with an external code in the removable memory module, and also unique to that decoder, to generate the common systemwide system code. Program viewership is written on the removable memory module which is returned to a central facility for later subscriber billing.

4 Claims, 5 Drawing Sheets

HIGH SECURITY PAY TELEVISION SYSTEM

CROSS-REFERENCE PAY TELEVISION SYSTEM

This application is a continuation-in-part of Ser. No. 660,512, filed Oct. 12, 1984 and now U.S. Pat. No. 4,696,034.

TECHNICAL FIELD

The present invention relates to systems for pay broadcast television in general, and relates, in particular, to a secure scrambling and unscrambling system for incorporation in a television receiver including a provision for the viewers to be billed only for the actual broadcasts or parts thereof watched by that viewer.

BACKGROUND OF THE INVENTION

It is becoming increasingly common for pay television systems to be utilized for the transmission of television programming to subscribes who are willing to pay either on a fixed periodic or pay per view basis for the programming. The most common pay television systems presently in use are operated in conjunction with cable system broadcast of television programming, but over-the-air systems also exist. The impetus behind the trend toward pay television broadcast is the need to generate monetary remuneration to program providers more than is normally obtainable through advertiser supported television or to program providers of programs for which the audience is more limited in size. In any pay television broadcast system, however, security needs to be a primary concern in order to ensure that viewers will pay for the programming broadcast rather than being able to gain unauthorized access to the broadcast programming in some fashion without the necessity for paying for the service.

Many systems are currently in operation for pay broadcast television, whether in cable or over the air, which include electronic scrambling of the broadcast television signal. Such a system requires a descrambler associated with the television receiving station and the descrambler must be, of course, particularly adapted to descrambling the type of scrambling imposed by the broadcast station on the particular broadcast signal. Usually a particular fixed format of decoder or descrambler is used at each receiving station which will in some fashion modify the broadcast signal in a way exactly complimentary to the way the scrambling device imposed a scrambling signal on the program signal at the broadcast station, so that the viewer views the complete unscrambled program at his location. The viewer is charged what is, in effect, a rental charge for use of the descrambler and usually this charge is made on a fixed. periodic basis, i.e. monthly, regardless of how much programming is watched. One aspect of such systems is that it is possible for unauthorized or "pirate" descramblers to be constructed by persons knowledgeable in electronic design and these unauthorized descramblers can become available legally or illegally to those willing to pay for them. Once a potential viewer has legally or illegally purchased such a descrambler, he then has free and unimpeded access to the scrambled broadcast signals indefinitely.

One system which has been utilized to try and avoid the possibility of unauthorized scramblers being obtained and used indefinitely makes use of a numerical code which is operated on by an algorithm to predictably derive either a scrambling or descrambling signal. The broadcast station imposes one polarity of the signal produced by the algorithm as a scrambling signal on the program signal while the receiving station imposes the exact complimentary signal using the same algorithm on the scrambled broadcast signal to descramble the program signal. In such a system it is necessary for the user to find out the code for the particular broadcast since the numerical code must be changed for each broadcast if unauthorized viewing is to be prevented for that broadcast. In the current systems in use, the viewer telephones the central billing station and requests the proper code for the particular broadcast he wishes to watch. The central station gets the identity of the viewer from his telephone call and gives the user the proper code which the user then enters onto a digital entry device contained on the decoding box at his viewing station to properly descramble the broadcast signal. The central station can then bill the viewer based on what programs the viewer has selected the proper code for. Such a system suffers from an obvious deficiency in that once the user knows the code, he can freely transmit that code to other subscribers to the system who have not given their names to the central billing station and the other subscribers may also then use that code to properly descramble and view the broadcast signal without paying for the service. Such a system may also occasionally have problems of access to the central billing facility during peak times when many viewers may call to request access to the proper codes to view particularly popular programs.

The more common systems in actual use today involve so-called "addressable" converters. These converters are contained descrambler units located at the viewers station which can be selectively turned on or off by the broadcast station. They are called "addressable" since each descrambler unit has a unique address or identification which can be called by the broadcast station in turning the converter on or off.

Another aspect into which effort has been directed in developing pay television systems is in the method of billing to the subscriber of the system. Many current cable and premium cable channel systems are charged to their subscribers on a fixed monthly basis. It is believed by many in the industry that many additional viewers would subscribe to such systems if they were charged on a pay per view basis rather than on a monthly basis. Unfortunately, few cable or other pay broadcast systems are currently technically able to bill subscribers on a pay per view basis because of either the technical difficulty or practical inconvenience in monitoring actual program viewing.

Some systems have been developed and are described in the prior art which are capable of billing pay television subscribers on a pay per view basis. Most of these prior art systems are based on a telephone data linkage between the decoder at the subscribers station and a central billing facility. The decoder is dialed up, or selectively accessed in some other way, by the central billing facility on a periodic, i.e., daily or weekly, basis to cause the decoder to transmit prerecorded viewing log information to the central facility. Such systems are obviously dependent upon a telephone linkage for their competent functioning. Other systems have been attempted in which some recording device is used at the receiving station which is sent to a billing facility to bill the viewer on a pay per view basis. These systems have not, however, had effective means to disable the viewers access to the programming if the viewer has not properly and timely paid his bill.

One system has been described, in U.S. Pat. No. 4,081,832, to Sherman, which makes use of a punched card carrying descrambling information thereon and which is also punched by the decoder to record program viewing.

Another development in the distribution of video programming is the widespread use of video cassette recorders (VCR). Since the VCR has become a common-place addition to home video equipment, it would make a pay per view system more desirable to the user if the system allows the recording and playback of pay per view programming. Program providers would, of course, want additional compensation for such playback. No system is known to yet exist which allows these two objectives to be met.

No prior art television broadcast signal scrambling system is presently in actual use which cannOt be overcome by a fixed electronic descrambler, if an unauthorized subscriber is willing to spend sufficient time and effort to develop or obtain such a descrambler in some unauthorized fashion. The present system is intended to provide such a system.

SUMMARY OF THE INVENTION

The present invention is summarized in that a pay television broadcast system includes: a broadcast station having scrambling means for imposing a scrambling signal on the program signal, the scrambling signal being generated through the use of an inverse of a signal generated from pre-selected changeable system code; a plurality of television receivers each having incorporated in them a decoder including descrambling means for imposing a descrambling signal complimentary to the scrambling signal on the received broadcast signal, the descrambling signal only being generated from the same system code, each receiver decoder including therein a fixed, station-unique internal code; and a portable digital memory module for each receiver decoder, each module carrying thereon a fixed, set-unique external code which can be combined with the internal code of the proper receiver to generate the system code in the receiving station, the memory module being removable from the receiver and replaceable so that the system code can be periodically changed.

It is the object of the present invention to provide a pay television broadcast system in which the scrambling to the broadcast signal is done in accordance with a numerical code which may be changed periodically and confidentially so as to make it difficult or impossible for a fixed invariable decoder to be developed by any unauthorized persons which could successfully descramble the scrambled broadcast code over any extended period of time.

It is another object of the present invention to provide a pay television broadcast system in which billing information is recorded by the user and transmitted to a central billing facility easily and conveniently without the need for cable or telephone access between the receiving station and a central billing facility.

It is yet another object of the present invention to provide a pay television access system which further includes therein a method for attributing a broadcast program viewed by a subscriber to one particular broadcast station of many broadcasting the program and also a method for allowing parental or other selective control of the general content of programs being described and viewed at the receiving station.

It is yet another object of the present invention to incorporate a decoder for a pay-per-view television system into an otherwise conventional television receiver.

Other objects, advantages and features of the present invention will become apparent from the following specification when taken in conjunction with the accompanying drawings.

DESCRIPTION OF THE PREFERRED EMBODIMENT

Figure 2:
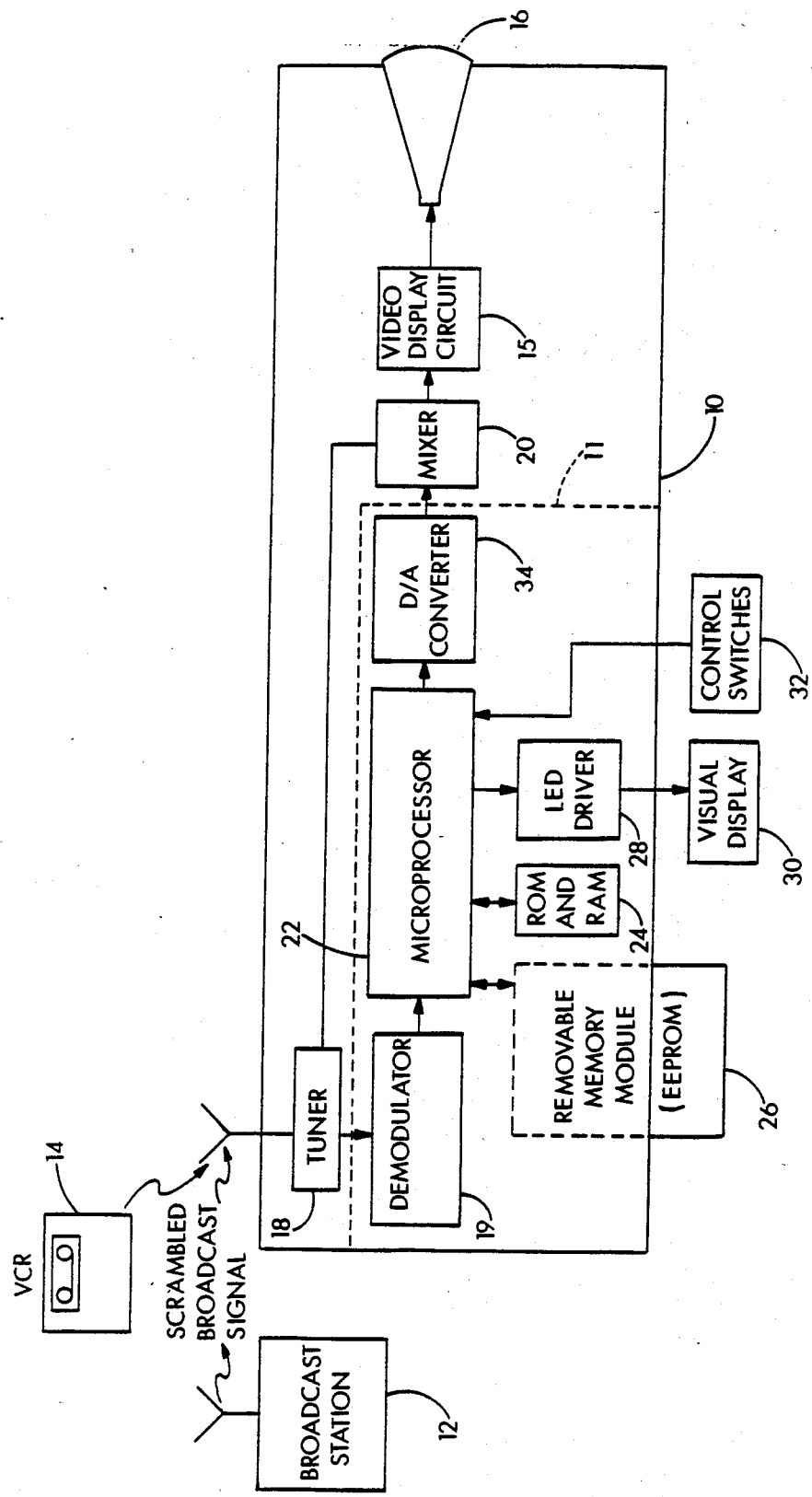
FIG. 2 is a schematic block diagram view of a broadcast system constructed in accordance with the present invention.

Illustrated in FIG. 2, and generally indicated at 10, is a television receiver for use in a pay television broadcast system constructed in accordance with the present invention. The receiver 10 is adapted to receive a scrambled broadcast signal from a broadcast station 12, broadcasting either over the air or over cable, from a video cassette recorder 14 onto which a broadcast station signal has been recorded, or from other television broadcast transmittal systems. A decoder circuit 11 in the receiver 10 is intended to unscramble the scrambled broadcast signal, assuming that the system user has been properly authorized to gain access to the broadcast signal, and produce an unscrambled composite video program signal for transmission to a conventional video display circuit 15 for display on a convention television screen 16.

The scrambled broadcast signal, whether from an over-the-air broadcast station or from a VCR or other pre-recorded media, is received in the receiver 10 by a television and tuner 18. The tuner 18 includes suitable electronics of a type well-known to the art to tune for the specific broadcast modulation frequency selected by the viewer. The output from the tuner 18, which is referred to a composite video signal, is transmitted to a demodulator for circuit 19 in the decoder 11. The demodulator 19 is to sample the composite video to demodulate from the composite video signal certain coded information for transmittal to the microprocessor as will be discussed in greater detail below. The coded information in the video signal derived from the broadcast signal, can be encoded by any of several well-known techniques, such as AM modulation of the FM carrier, vertical blanking interval transmission, or the use of a subcarrier. The particular method used for encoding these digital broad-cast codes in the broadcast signal is not important as long as the decoding circuitry included in the demodulator 19 is relatively economical and efficient.

The composite video output of the tuner 18, which is a broadcast signal which is still scrambled, is transmitted directly to a mixer 20 located at the output end of the decoder 11. The mixer 20 includes two inputs. If the other input to the mixer 20 precisely is complementary to the scrambling signal imposed on the scrambled broadcast signal, the action of the mixer 20 in combining these two signals will result in a completely unscrambled video program signal as the output of the decoder 11 for transmittal on the television screen 16. The remaining elements of the decoder 11 are intended to generate this complementary descrambling signal.

The output of the digital code decoder in the demodulator 19 is fed as input to a microprocessor 22. The microprocessor 22 has access to electronic memory 24, in the form of both read only memory (ROM) and random access memory (RAM), which may or may not be included in a single integrated circuit with the microprocessor 22 itself, or which may also be included in a separately located integrated or discrete memory module 24 located in the decoder 11. The microprocessor 22 also has an interface to receive and write information onto a removable memory module 26 which can be removed from the decoder 11 and which will be discussed in greater detail below. The microprocessor 22 also provides outputs to LED drivers 28 which are connected to a visual display 30 consisting of LEDs or other optical signal generating apparatus. The visual display 30 is used to display the status of the decoder operation to the viewer, such as station watched, program content or cost, etc. One or more control switches 32 are located on the exterior of the decoder 11 which provide inputs which can be read by the microprocessor 22. The output of the microprocessor 22 may be fed to a digital to analog (D/A) converter 34 whose output is connected to the mixer 20. The converter 34 may also be omitted if an all digital scrambling technique is used.

Figure 1:
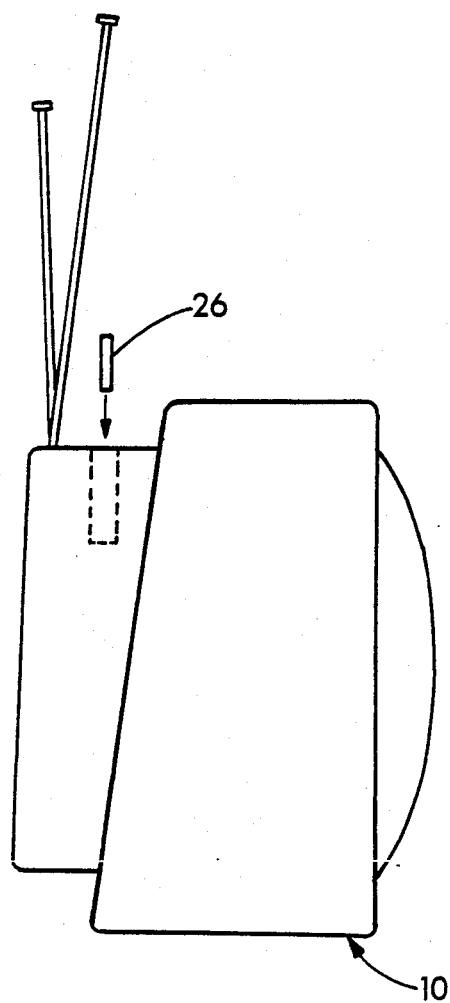
FIG. 1 is a schematic view of a television receiver constructed in accordance with the present invention.

The location of the removable memory module 26 is schematically illustrated in FIG. 1. The removable memory module is inserted into and removable from a special slot formed in the receiver 20 having suitable electronic connection to connect the removable memory module 26 into the decoder 11.

In order to understand the functioning of the decoder 11 as illustrated in FIG. 2, it is necessary to understand the purpose, identity and function of four different codes associated with the pay television broadcast system disclosed here. These codes are referred to as numerical codes since they are most easily used in a digital form but it should be understood that the exact manner of expression of the codes may vary from system to system and that many forms of digital code expression are usable in a system of this type, such as binary, binary-coded decimal, decimal, hexadecimal, ASCII, etc. It is simply important that these codes be digitally transmissible and be capable of being processed and operated on in the decoder 11.

A first code used in the system is referred to as the broadcast code. The broadcast code is a numerical code associated with a specific television program broadcast. The broadcast code is imbedded in the television broadcast signal by any of several methods such as AM modulation of an FM audio carrier, an inband FSK (frequency shift keyed) modulated carrier signal transmitted within the vertical blanking interval in the broadcast signal, the use of a subcarrier, or by any of the other well known methods of transmitting digital information along with the analog television picture signal. Whatever method is used for modulating the broadcast code into the broadcast signal, the demodulator 19 must be specifically adapted to demodulate that specific numerical broadcast code from the input broadcast signal and transmitting it to the microprocessor 18. Such demodulators are well known in the art. As will be discussed in greater detail below, the broadcast code may include smaller units, or sub-codes, which may serve as an identification of the exact program being broadcast, of the broadcast station, and of the category of program content contained in the broadcast signal program. Other useful information as may be appropriate for a given system may also be included in the broadcast code.

Three related codes utilized within the system of the present invention are the internal, external, and system codes. The first of those codes is referred to as an internal code. The internal code is contained in the ROM 24 associated with the microprocessor 22 and is unique to each of the decoders 11 constructed in accordance with the present invention. The external code is a code which may, for purposes of understanding, be considered as a sort of compliment to the internal code. The external code is contained in the removable memory module 26 which is uniquely associated with the decoder 11. In general, the internal and external codes may be manipulated or combined by a standard algorithm, such as simple addition, to arrive at the system code which is common to all of the decoders 11 in all the receivers 10 used within a single pay television broadcast system constructed in accordance with the present invention. While simple addition of the external and internal codes will usually prove sufficient, it is certainly possible for the operation of combining the internal and external codes to involve a more sophisticated simple or multi-step algorithm as long as the result of the combination is predictable. The internal code contained in the ROM 24 of each decoder 11 is fixed and unique to the specific decoder 11 while the external code, contained in the removable memory module 26 for that specific decoder 11, must also be unique to that decoder 11 but is changed from time to time so that the system code can be changed. In other words, the internal code is constant while the external code and the system code are changed from time to time in synchrony. External codes are normally changed by replacing the removable memory module 26 but it is also possible for one module 26 to carry more than one external code with the proper code being either selected by time period or by the broadcast code as in the example below.

The other specific detail of the system of the present invention requiring specific explanation is the provision for the removable memory module 26. The removable memory module is be a module of electrically alterable and readable memory which must be removable from the decoder 11 in the receiver 10 and transportable. While a wide variety of removable and portable memory media are suitable within the use of a system in accordance with the present invention, it is particularly useful to use a small card or plastic holder containing therein an erasable programmable read only memory (EPROM) circuit or, most preferably, an electrically erasable programmable read only memory (EEPROM). The use of an EEPROM as the module 26 allows for a small and lightweight memory module to be utilized which can be readily transported, as through the mail, and which can be carried in a suitable carrier so that it can be easily plugged into and removed from a suitable port formed in the receiver 10 as shown in FIG. 1. Other suitable portable, removable magnetic or electronic digital memory modules are possible in substitution for the EEPROM, including, most notably EPROMs and magnetic cards or strips. An EEPROM offers the best alternative because of its ease of re-use and adaptability. The EEPROM carrier should mate with the receiver 10 so that the electronic circuitry of the decoder 11 and its microprocessor 22 can read from and write to the EEPROM 26. It is specifically intended that the removable memory module, in the form of the EEPROM 26, will be replaced periodically, as for an example, monthly, and be transmitted to a remote location for reading for billing purposes. Subsequent removable memory modules 26 will be provided to the system subscriber on a periodic basis, i.e. monthly. It is specifically intended that new removable memory modules 26 will be provided to the subscriber only if the subscriber has suitably paid for usage recorded in a prior removable memory module 26 previously sent to the central billing system. The removable memory module 26 therefore must include provisions for carrying thereon an electronically or electromagnetically readable message and must have a provision thereon for writing program viewing information thereon so that it can be returned to the billing authority for scanning to determine what the system subscriber has viewed. Each removable module 26 carrying codes thereon is unique to a pre-selected receiver 10 since the external codes on it are only properly complementary to the internal code of that decoder 11 of that receiver 10 so each module is only useful at a pre-determined viewing station for a pre-selected time period.

Figure 3:
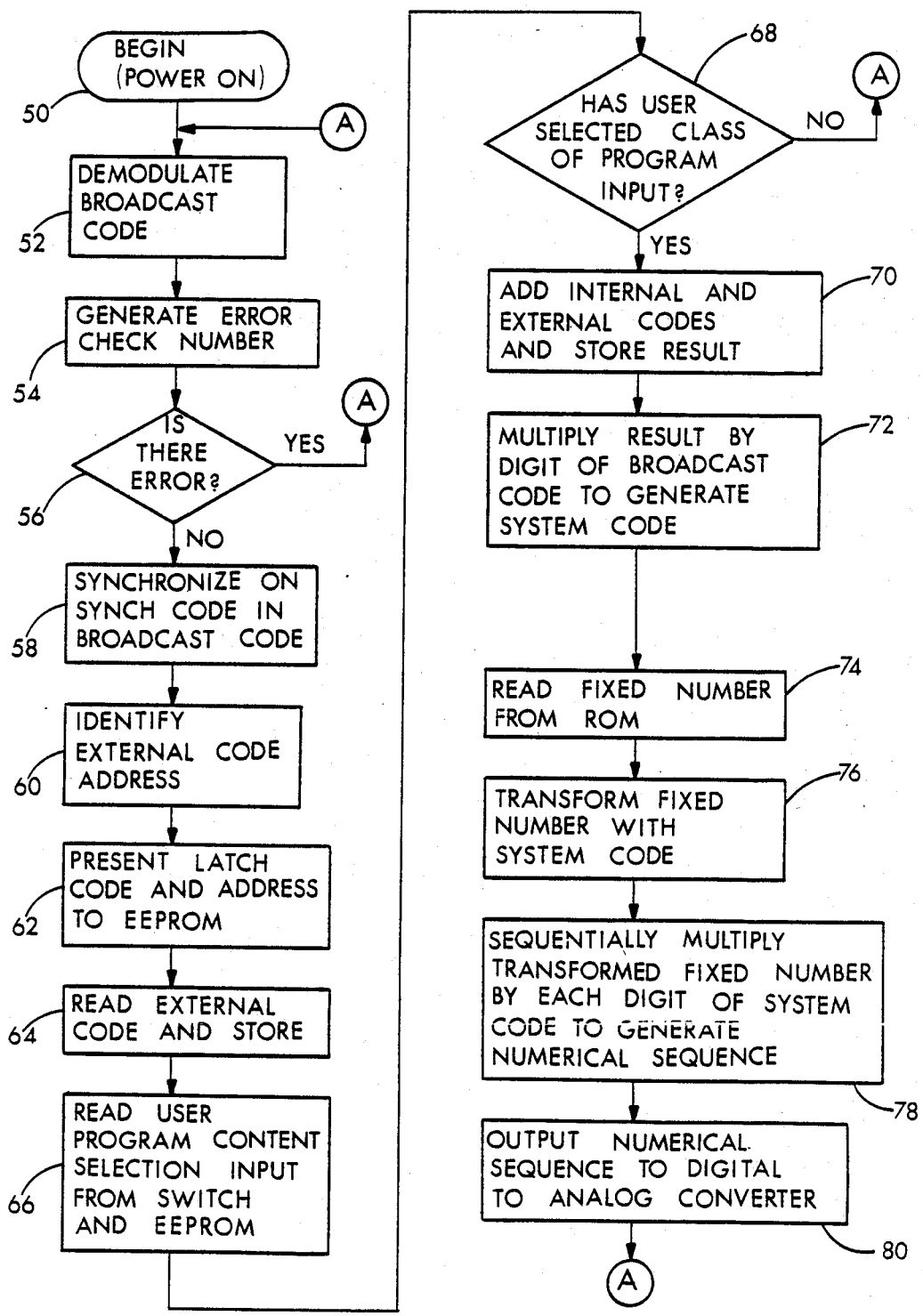
FIG. 3 is a flow chart indicating the functioning of a program for operation of the microprocessor contained in the decoder of the system of FIG. 1.

Illustrated in FIG. 3 is a flow chart demonstrating in schematic chart form the general operation flow of the programming for the microprocessor 22 of the decoder 11. The microprocessor is in constant operation when the decoder is in use and so begins operation with the powering up of the decoder 11 as designated by program step 50 in FIG. 3. As the program proceeds in its operation, the next program step executed is at program step 52 in which the demodulator 19 is enabled to demodulate the broadcast code from the composite video from the tuner 18. This demodulated broadcast code, as first described above, is a numeric code, in binary, preferably carried in a non-video portion of the broadcast signal. An error check routine is preferably included in the broadcast code, such as a parity check or other similar routine, and the program then proceeds to program step 54 to generate an error check number and ascertain that no error in the transmission of the broadcast code has occurred. If the program does detect an error in the broadcast code, execution of the program loops back to the point designated at A to retrieve a second broadcast code from the scrambled broadcast signal. If the error check number indicates a satisfactory operation and there is no error detection, the program proceeds past the error check test at step 56 to program step 58. In program step 58 the program times itself based on the receipt of the broadcast code. The execution of the subsequent program steps need to be synchronized with the time period of the scrambling wave imposed on the broadcast signal. Therefore the first part of the broadcast code preferably includes a synchronization segment so that the decoder 11 can synchronize its generation of the descrambling signal with the scrambling signal. Assuming that all the microprocessors 22 and each of the decoders 11 in the entire broadcast system has a crystal oscillator having a sufficient accuracy in its clock timing, the timing of all the program steps subsequent to step 58 can be empirically measured and the imposition of the scrambling signal on the broadcast signal can be synchronized to delay for a time period sufficient for the program and the decoders to institute the descrambling signal in synchronization with the scrambling signal imposed on the broadcast code.

After the program is suitably synchronized, the program then proceeds to step 60 in which the program identifies an external code address. The external code address will be one of the addresses contained in the removable memory module or EEPROM 26. It is specifically intended that within the removable memory module 26 there can be more than one external code. Thus for any viewing period there can be several external codes which may be usable and any one of the codes can be selected for use in generating the system code during a particular program broadcast. If only one external code is used at a time in the memory module 26, this step can be omitted. A portion of the broadcast code is used as an address locator and may be subject to mathematical manipulation or multiplication to generate an external code address. This address is generated internally by the microprocessor 22 and is presented to the removable memory module or EEPROM 26 to read the external code. However, before the external code can be presented, an additional security measure must be overcome. The EEPROM 26 is preferably presented with a latch code. The latch code is a numeric code which must be presented to the EEPROM 26 before the EEPROM 26 will accept an address and allow access to the contents of data in its memory. It is specifically preferred that custom EEPROMs 26 be constructed which will completely disable themselves and render themselves non-functional if an incorrect latch code is presented to them. This can be accomplished by constructing the EEPROMs with a disabling fuse connected to the endpoints of all incorrect switching patterns so that the EEPROM will be disabled if the latch code is wrong. Thus at program step 62, the microprocessor 22 presents to the EEPROM 26 the latch code to enable the reading of information contained in the removable memory module or EEPROM 26. Then, in program step 64 the external code is read from the removable memory module 26 and stored in the random access memory of the microprocessor 22. The microprocessor now contains in its memory both the broadcast code derived from the scrambled broadcast signal generated by the broadcast station and also contains within it the external code retrieved from the removable memory module 26. It is assumed that the microprocessor 22 already has access to, preferably stored in its own ROM 24, its own unique internal code specific to the receiver 10.

At program step 66 the microprocessor scans the status of control switches 32. The control switches 32 are intended to allow the user to select a program content level by setting the control switches 32. For example, if the control switch 32 consists of one simple two pole switch, one pole might indicate adult only viewing while the other pole of the switch 32 might indicate viewing suitable for both adults and children. At program step 62, the microprocessor 22 will read the status of the control switch or switches 32 to determine the program content level selected by the user. The EEPROM 26 may be provided with decoding information to enable the microprocessor 22 to relate the output of the control switches 32 to specific program content available for viewing in that billing period. It is also specifically preferred that the control switch or switches 32 may be under the operation of a security device, such as a lock and key, which would allow parents to disable the receiver 10 from descrambling programs of adult content but which would still allow the parents or other controllers of the decoder 10 to gain access to all program materials which they would choose to view. The program then proceeds to a branch test at program step 68 to determine whether the user has selected the proper class of programs for input which are presently being received on the broadcast signal. This decision is made by comparing the status of the control switches 32 with the program content coding contained within the broadcast code. If the broadcast code contains program content identification which is allowed for viewing by the control switches 32, the program proceeds through conditional branch 68 to execute the remainder of the program to descramble the broadcast signal. If this class of program content has not been selected by the user, the program branches back to A and the broadcast signal is therefore not descrambled and no access to this unscrambled signal is available to the user.

If the program successfully passes conditional branch 68, the program then proceeds to program step 70 in which the internal and external codes are added together and the result is stored separately. The program then proceeds to program step 72 in which the result of addition of the internal and external codes is multiplied by a digit of the broadcast code to generate the system code. It should be specifically remembered at this point that the system code is a system-wide code which again is preferably a binary number common to all of the receiver 10 contained in the system. Since the broadcast code is also common to all of the decoders contained in the system, it is therefore the addition of the internal and external codes which gives rise to a number which is system-wide in use. The provision for step 72 to multiply that system-wide total times a digit of the broadcast code is only to allow the internal and external codes to be shorter in the number of digits. If a sufficient number of digits can be contained in the removable memory module 26 to allow sufficient number of choices of external codes, program step 72 can be omitted, and the system code can be determined simply by adding the internal and external codes together. The exact method of combining the external and internal codes together to generate the system code may be varied and any simple or complex algorithm could be used, such as addition, multiplication, addition and multiplication (as in this example) or any other similar technique. It is simply necessary that the algorithm be predictable and that both the internal and external code are necessary to generate the system code. What is specifically important to the functioning of the device as envisioned by the present invention is that the internal and external codes be unique to the specific receiver 10 while the system code generated by use of the combining algorithm on the internal and external codes is system-wide in its usage.

At program step 74 the program proceeds to fetch a pre-selected fixed number from the ROM 24 associated with the microprocessor 22. At program step 76 the program uses the fixed number to transform the system code into a larger digit number. This may be a simple multiplication step or may be some other mathematical or algebraic expansion of the system code to make a transformed fixed number having a larger number of digits. The purpose in the transformation step embodied in steps 74 and 76 of the program is to allow a system code of a smaller number of digits to be utilized, with the number of digits in the code being predictably expanded by steps 74 and 76 to make a fairly lengthy numerical sequence for use in the descrambling technique. At program step 78 the transformed number is then sequentially multiplied by each digit of the system code to generate a continuous numerical sequence. That numerical sequence is treated as a series of digits which are then outputted at program step 80 to the digital to analog converter 34. After output of the numerical sequence to the digital to analog converter 34, the program again loops back to A. The purpose of the numerical sequence generation and program step 78 and the output of that sequence in program step 80 is to create a sequence of single digit numerical numbers at the output of the microprocessor 22. These numbers can be 4 or 8 bit in character, or any other bit size appropriately selected for the application. This numerical sequence is converted by the D to A converter 34 to an analog voltage level which is inputted to the mixer 20. It is specifically intended that the broadcast station 12 broadcasting the scrambled broadcast signal has used the similar numerical sequence in its scrambling operation and the exact inverse of the D to A converter 34 contained in the decoder to impose a scrambling signal on the broadcast signal which should be the exact compliment of the output of the D to A converter 34 if the microprocessor 22 has properly enabled descrambling of the broadcast signal. If digital scrambling is used, the two D to A converters may be omitted. It is specifically intended that the sequence of numerical digits created in program step 7,8 should be exactly sufficient to cover one preselected repetitive period of the broadcast signal, such as a single frame of a video transmission. Thus the length of the numerical sequence created in step 78 is preferably adjusted, depending on the time period for each scrambling sequence selected and on the bit size of the numerical output of the microprocessor 22. It is simply important that the output of the microprocessor 22 be a predetermined fixed numerical sequence which is derived through an algorithm solely dependent on the numerical system code for its effective and reliable operation.

It would also be necessary, in addition to the program steps illustrated in FIG. 3, that the program periodically write the identification of the program being watched by the viewer on the EEPROM 26. This is not illustrated as part of the program sequence of FIG. 3 since it would only have to be done at great intervals compared to the descrambling which must be done continuously. Periodically the program would either branch or interrupt and a routine called to write the program and perhaps the broadcast station code on a suitable location on the EEPROM 26. The routine also would appropriately look for the correct location to write these codes so that they could be properly read when the module 26 is sent to the central billing facility. Thus the particulars of this routine and the code writing format on the EEPROM 26 are not critical as long as the results are predictable and the results retrievable.

In order to better illustrate the workings of the present invention, the operation of this system will be described with reference to a particular example of its application. These numbers will be presented here in decimal, or base ten, format solely for the convenience in comprehension by the reader. Assume, for example, that the broadcast code incorporated into the scrambled broadcast signal consists of the following number: 10101 8252 1 17 110 230.

This broadcast code consists of several parts. The first part is the numerical sequence of numbers 10101, which sequence can be of any selected length and which is intended to provide synchronization information for the system. The next section of digits can be selected, as for example the digits 8252, which can serve as the program identification number. This program identification number or code can consist of one or more imbedded items of coded information. For example, the first digit could represent cost category or price category information on the program being received while the last digit of the program identification number could be used to identify the address of the external code to be utilized to decode this particular program. The incorporation of the price category digit into the program identification code is intended primarily for use in on-site billing situations such as might be appropriate in a motel or hospital or a video tape rental location. It is the overall program identification number, in this case 8252, which would be written by the microprocessor in the removable memory module 26 to indicate that the program was watched by the consumer. The central billing system would know from the program identification number what the title of the program was and the exact price to be charged to the subscriber for viewing that program. The next digit in the code, in this case the 1, is used to represent the actual segment of the program watched. Thus programs would preferentially be divided into a number of segments and the viewer would only be billed for those segments which were watched by that viewer. The succeeding segment of the code, i.e. the number 17, would be a check sum which is the error check number generated by the system for use in the error check at program step 56. In this simplified case this error check sum represents the sum of the program identification numbers 8, 2, 5, and 2, which added together equal 17. A more complicated error check algorithm could of course be utilized, although a simple system may be more reliable. The next succeeding three digits of the broadcast code, in this case 110, allows a unique code to be assigned to the local distributor or station from which the program is being broadcast. This allows the broadcaster to place a unique code on the broadcast signal. It is intended that this code also be written onto the removable memory module 26 so that the broadcasting station can be given the proper credit for the viewer watching that particular station if more than one station is utilizing the system and broadcasting into the same competitive viewing area. The final three digits of the program broadcast code, in this case, 230, represent the parental control code. This code designates the rating of the program in terms of categories such as sexual content, level of violence, or political controversy. This code is the one intended to be compared to the output of the control switches 32 to determine whether the selection of the content of the program has been made by a viewer.

Once the broadcast code is contained in the microprocessor memory, and once the synchronization has occurred at step 58, the program takes the digit from the broadcast code representing the external code address and identifies and obtains the code from that address at program steps 60 through 64. The external code is transferred into memory. In this example assume that the external code is 282.

The program next makes the determination of whether the user has selected that class of program input. In the example described herein, the program would branch to determine if the class of programs assigned class category 230 have been selected by the viewer. Assuming that this program category is acceptable to the viewer, the program then would proceed to step 70 to add the internal and external codes. If the external code is, for example, a number equal in length to the internal code, such as the number 217, the addition of the internal and external codes would usually yield a numeral of the same number of digits, in this case i.e. 499. In the particular circumstance described in which three digit codes are used, the system code, i.e. the number 499, would be common to all of the decoders used in the system for a given viewing time period. The external code 282 would be unique only to the particular decoder 10 which has therein an internal code 217. A decoder 10 which has therein an internal code 216 would require an external code 283 etc. Obviously other more complex methods of combining an internal and an external code together to make a predictable system code are possible within the workings of this system, although simple addition should often prove satisfactory.

Once the system code is generated, the steps 72 through 78 are followed to generate a numerical sequence. For purposes of this example, assume that the system code 499 is then multiplied by a selected and common digit of the broadcast code. One or more multiplications could be performed depending on the size of the numeral which it is desired to create. Assume for the purposes of this example that the system code, 499 is multiplied by 825, a portion of the program identification code, and also by a numeral 7, obtained from the error checking number, to yield an enlarged multiplicand of the system code of 2881725. The purpose of this numerical expansion of the system code is to allow for a larger number to be utilized in the numerical sequence generation to make the creation of a descrambler not dependent on the system code a much more sophisticated and technologically complex project.

This multiplicand is then operated on by a fixed number utilized by all of the decoders in the system to expand this multiplicand further to generate the numerical sequence. Assume here that the fixed number in this instance is 4598123. Assume that the transformation in this simple example is a simple digit shift of the fixed number around a digit selected by the last digit of the expanded system code. The last digit is 5 and if the fifth least significant digit of the fixed number is shifted to the most significant, the transformed fixed number is 9812345.

Multiplying the transformed fixed number times each digit of the expanded system code yields a numerical sequence as follows:

9812345×2=19624690
9812345×8=78498760
9812345×8=78498760
9812345×1=98123450 etc.

This sequence of multiple digit numbers is transferred to the D/A converter 34 in appropriate four or eight bit words and this sequence is thus converted to an analog signal. The analog signal is the descrambling signal which is applied to the mixer 20 to descramble the broadcast signal.

Thus, in essence, a pay per view broadcast television system utilizing the present system would work as follows Each month, or other preselected time period, the central billing facility would send each subscriber a removable memory module in the form of an EEPROM 26. That EEPROM would be usable only with the receiver 10 owned or operated by the subscriber. Since the receivers 10 are completely ineffectual to receive scrambled broadcasts without the appropriate decoders 11 and the removable memory module 26, the receivers 10 must be purchased by the potential subscribers. The viewer can then view any scrambled show which he may desire by inserting the removable memory module 26 into his receiver 10. The program signal is then properly decoded and the viewer can watch the program. At various points during the program, the microprocessor 22 writes the program identification code or number onto to the EEPROM 26 to record the viewer's watching of the program. At the end of the month, the viewer would receive a new removable memory module in the mail together with suitable packing or mailing information to send the previous month's EEPROM 26 back to the central billing facility. The viewer would then insert the second EEPROM 26 in the receiver 10 to enable his system to work during the succeeding month. At the central billing facility the EEPROM submitted by the user would be read and a bill generated depending on the viewership and transmitted to the subscriber. The subscriber would only receive the appropriate EEPROM 26 for future months in the event that his account is paid up to date. At any point if his payment history becomes unacceptable, it is merely necessary not to send him a new EEPROM 26 such that he will be unable to view descrambled programming when the system code is next changed.

In this fashion a highly reliable and technically sophisticated scrambling system is provided which has high security. It will be very difficult for unauthorized individuals to construct decoders which could reliably decode the descrambled broadcast signal created by the present system since such a decoder would only be effective if the system code was known, and the system code is intended to be changed monthly and kept confidential. The EEPROMs 26 are also secure since there is little incentive for anyone to attempt theft of the modules because they will not work in any decoder 10 other than the one for which they have specifically been coded. Thus the system provides a high level of security heretofore unprecedented while also providing a system which is simple to implement and whose hardware is inexpensive and convenient. The system does require some very minimal amount of participation by the viewer but it should be extremely easy for the viewer to do the necessary activities, i.e., plug in the EEPROM 26 and remove it at the end of the month and this should not be a significant problem for implementation of the system.

Figure 4:
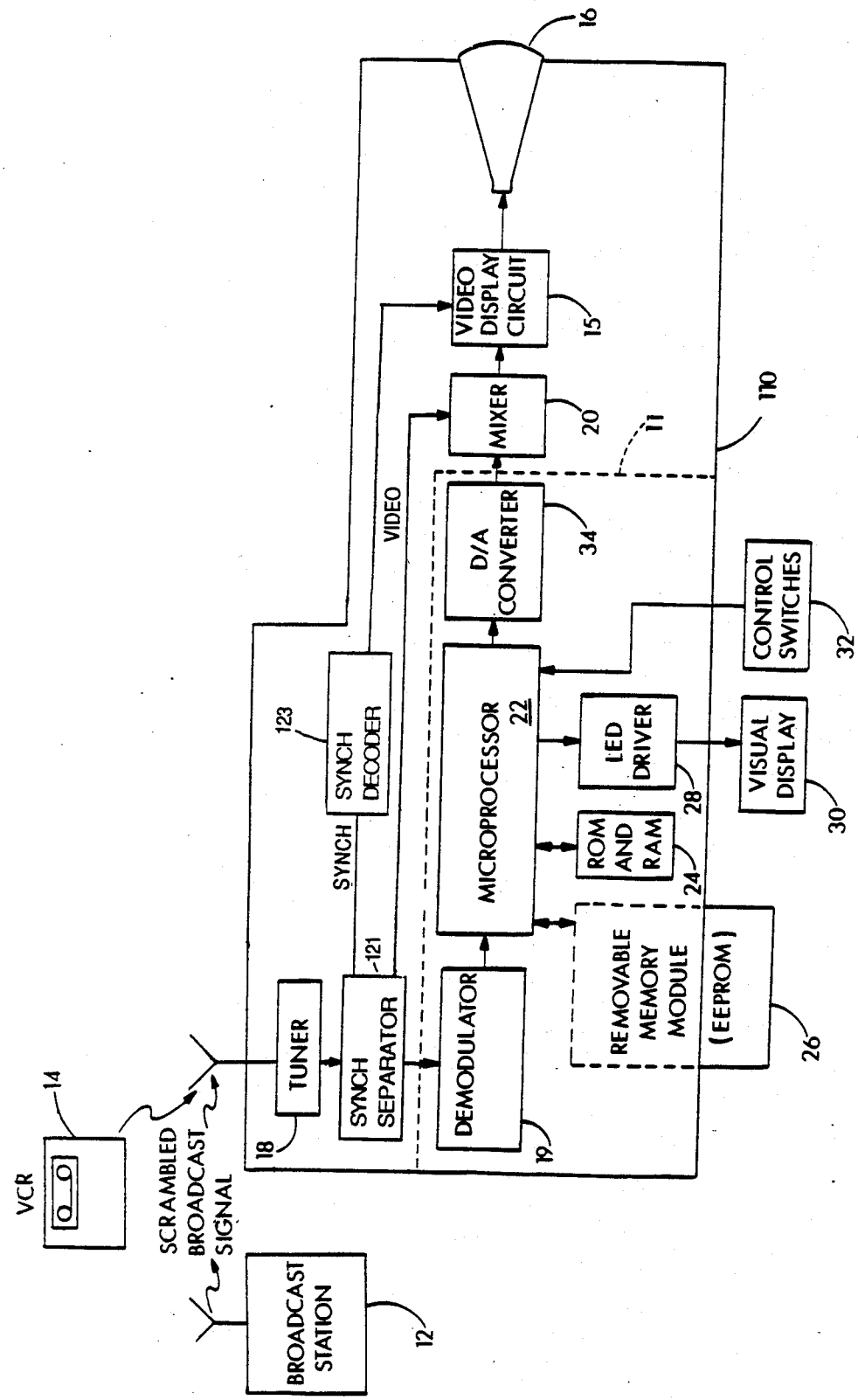
FIG. 4 is a schematic block diagram view of an alternative embodiment for the receiver of the system of FIG. 2.

Shown in FIG. 4 is an alternative embodiment of a television receiver for use in a pay television broadcast system constructed in accordance with the present invention. The television receiver of FIG. 4, designated 110, has its parts which are similar to those of the embodiment of FIG. 2 similarly numbered and new parts preceded with the prefix "1". The receiver 110 includes a tuner 18 to receive the input from the antenna, which input could still be either from over-the-air broadcast signals or from pre-recorded broadcasts played on a VCR. The output of the tuner 18 is not fed directly to the demodulator 19 but instead passes first through a synch separator 121. The synch separator 121 is a circuit, typically present in every television receiver, which is intended to sense and separate out from the composite video signal, the synch pulses for determining synchronization of the television sweep scan. The synch pulses may be either the horizontal synch, for synchronizing horizontal sweeps of the CRT, or vertical synch, for starting a new screen, or both. In the block diagram of FIG. 2, such a synch separator 121 would have been located in the video display circuit 15 of the embodiment of FIG. 2. In the embodiment of FIG. 4, this synch separator circuit is separated from the remaining components of the video display circuit and put up-stream of the decoder 11 in the flow of video signal to the television screen 16. The output of the synch separator 121 therefore consists of two outputs, a composite video signal which has been stripped of the synch signal and also a separate line containing just the synch signal. The composite video output stripped of the synch signal is fed, as in the embodiment of FIG. 2, to the demodulator 19 located in the decoder 11 and also to a mixer 20 located at the output of the decoder 11. The decoder 11 is identical to that shown in the embodiment of FIG. 2. In the embodiment of FIG. 4, an additional decoding circuit, referred to as the synch decoder 123 is located between the synch separator 121 and the rest of the video display circuit 15. The synch decoder 123 may be constructed in several fashions. It can be an entire decoder circuit similar to the decoder 11 and including a microprocessor, memory, and digital analog conversion circuits. The synch decoder 123, if constructed in that fashion, would not need its own internal and external codes, but could be constructed to communicate with the microprocessor of the decoder 11 so that the microprocessor 22 could transmit the external and broadcast codes to the synch decoder 123 which would have its own internal code. Alternatively, the synch decoder 123 could be of greatly simplified construction and could consist of a much more basic descrambling circuit appropriate to the type of encryption used in the system.

When a pay per view broadcast system is constructed for use with television receivers constructed in accordance with the embodiment of FIG. 4, the broadcast signal would be subject to dual encryption. The first encryption, or scrambling, would be with the system code referred to previously in the specification. The other encryption is that, usually through a much more basic scrambling method, the synch pulses would be scrambled. Such a simpler system might be time displacement of the synch pulses or the simple addition of synch pulses with a fixed pre-selected digital train of signals, or other simple system. Alternatively, the synch could be encoded with a different system code and scrambled in the same fashion as the main video signal. In any event, the critical part of this concept is that the synch is separately and independently scrambled from the composite video signal. At the receiver 110 as illustrated in FIG. 4, the synch is stripped from the composite video by the synch separator 21 and sent through the synch decoder 123 for separate and independent descrambling. The main video signal, stripped of the synch component, is still processed by the decoder 11 in the same fashion as in the embodiment of FIG. 2. Once the synch is decoded by the synch decoder 123, and the remaining composite video decoded by the decoder 11, both signals are then fed to the video display circuit 115 for display on a conventional cathode ray tube 16 in a fashion normal to the art.

The advantage to the embodiment of FIG. 4 is that there is no one point within the television receiver 110 at which a complete composite video signal may be tapped out of the receiver 110. This is, in essence, an additional form of security. It is conceivable with a receiver constructed in accordance with the embodiment of FIG. 2 that hobbyists or electronics technicians could eventually recognize that between the mixer 20 and the video display circuit 15 is a composite video signal which could be tapped out of the receiver 10. That composite video output could be recorded and displayed on any suitable monitor, outside of the billing process inherent in the security of the system in accordance with the present invention. In the receiver 110, no single output point is available from which a composite video, with proper synch, could be tapped. Even after the mixer 20, the signal at that point, containing composite video stripped of synch, if recorded and fed to a suitable monitor would create a signal lacking in synch and therefore unviewable. While the embodiment of FIG. 4 is illustrated with the synch stripped from the composite video and separately decoded, there are several other ways in which the signal could be split and then separately decoded. For example, after the receiver has broken the television signal into its video and audio components, they could be separately descrambled. Or, alternatively, the luminescence, vertical synch, and the horizontal synch, as well as the audio component, could all be separately scrambled. In a color system, the different color components, red, green, and blue could be separately scrambled. In any such system, more than one component could be scrambled, although all need not be. The general concept is that nowhere in the television receiver would exist a single signal which could be tapped out of the receiver and recorded for later viewing outside of the pay per view system.

Figure 5:
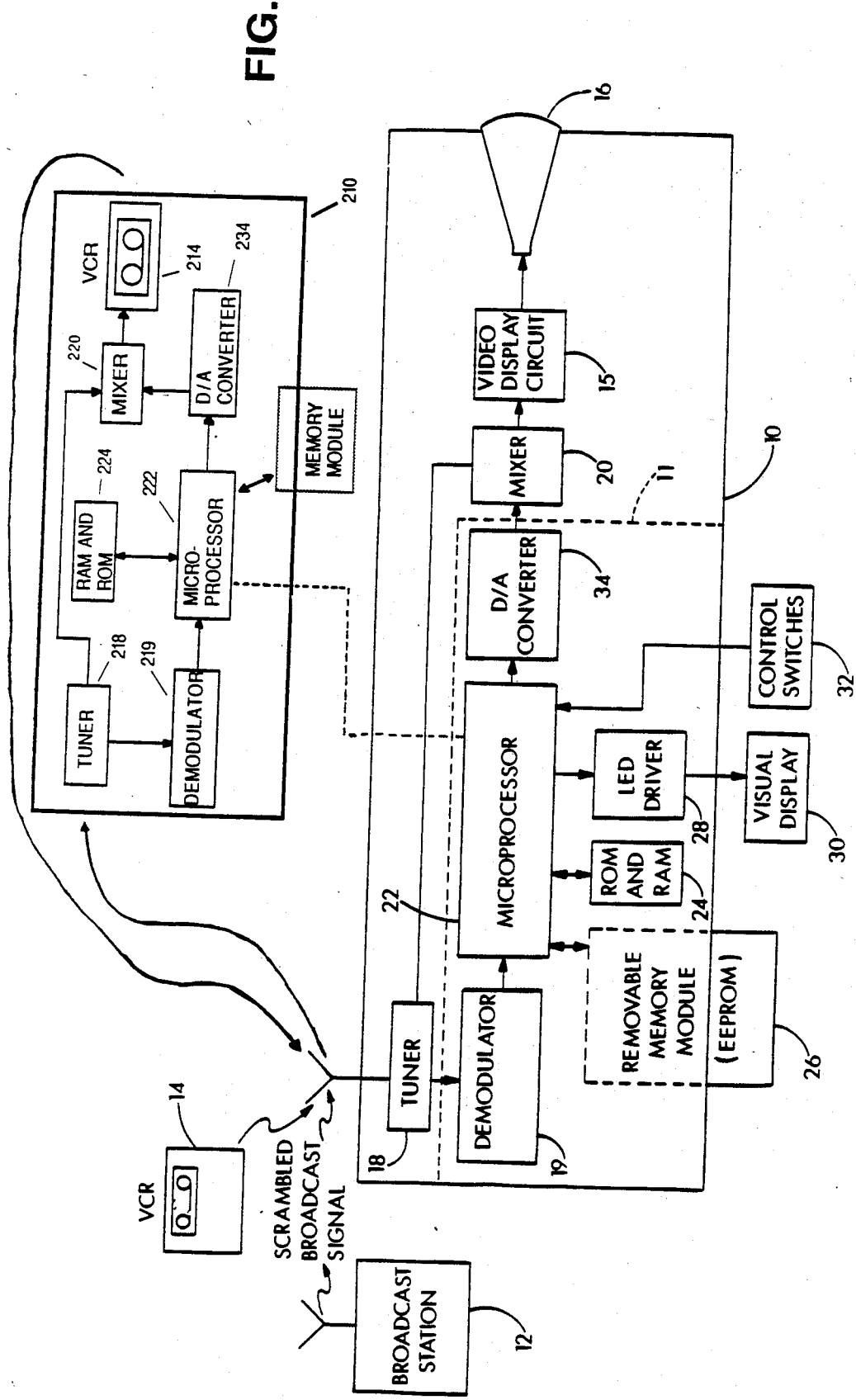
FIG. 5 is a schematic block diagram of another alternative embodiment for the receiver of the system of FIG. 2.

Shown in FIG. 5 is both a television receiver 210 and a special decoder 211 installed in a VCR 214 and constructed in another variation of the present system intended to allow for the taping and rebroadcast of live programming on video cassette recorders. The video cassette decoder 211 includes a tuner 218, the modulator 219, a microprocessor 222, ROM and RAM memory 224, a D/A converter 234 and a mixer 220, all constructed in a fashion analogous to the similarly numbered components of the decoder 11. In addition, the microprocessor 222 of the video cassette decoder 211 could be constructed with a communication link to communicate, by appropriate cabling, with the microprocessor 22 of the decoder 11.

In the operation of a system which allows for the use of a video cassette decoder 211, the broadcast signal would be twice encoded. First, as usual, the broadcast signal would be encoded with a digital sequence created from the system code. Then, in addition, the broadcast signal would also be encoded with a second digital stream generated from a fixed cassette code. This cassette code would be fixed over time and not changeable. While this encoding could be done in two steps, it could also be performed in a single operation if the numeric values of the system code and of the cassette code were logically added before the scrambling step. The video cassette decoder 211 would then remove from the input video signal only the current system code. The descrambling of the video signal in the video cassette decoder 211 would otherwise be in complete accordance with the manner of functioning of the decoder 11. The video cassette decoder 211 would either have its own removable memory module 26 or would communicate with the microprocessor 22 of the decoder 211 by data link in order to gain access to the external code in the decoder 11 in order to be able to decode the system code. The video cassette decoder 211 would remove the system code from the incoming video signal, but not the cassette code. The video programming would therefore be written on the video cassette in a scrambled fashion, still containing the cassette code scrambling signal. The video cassette decoder 211 would also add a code to the broadcast code which is recorded on the video cassette recorder 214 to indicate that the material has been processed by the video cassette decoder 211.

In replaying a tape from the video cassette 213 connected to the video cassette decoder 211, the tape would be played and the modulated signal fed back to the tuner 18. The microprocessor 22 would be programmed to recognize the code imprinted into the broadcast code indicating that the program had previously been decoded by the video cassette decoder 211. In that event, the microprocessor 22 would not subtract the system code from the incoming signal, but would only subtract the cassette code which would be preloaded in its ROM or located on the memory module 26. This removal by descrambling of the cassette code from the incoming broadcast signal would result in a completely descrambled program signal. The microprocessor would, at that time, be instructed to write appropriate billing information to the removable memory module 26. In this way, users would be free to videotape all appropriate material, as long as the video cassette decoder 211 is used, and would be free at any point to play that material back through the receiver 10 of FIG. 5. The billing to the user would then be based on how many times the user views the taped material. In this way viewers would be free to time-shift programs and may record a library of programs. The providers of the programs would have no objection to users then taping the program and viewing them at their leisure, since the users would pay on a pay per use basis for the recording and review of any of such programming.

An alternative method for constructing the video cassette decoder 211 would be for the video cassette decoder 211 to entirely descramble the program signal, which would have been scrambled only with a single system wide system code. The descrambler 211 would then partially rescramble the code based on a fixed algorithm (i.e. a cassette code) which would be unchangeable over time. The video cassette decoder would also continue to alter the broadcast code to indicate that the material had been recorded. If this alternative was used, when programming was replayed from the VCR, the microprocessor 22 would detect the presence of tape material from the information in the broadcast code and would apply the simplified fixed descrambling algorithm (i.e. cassette code) to the program signal coming from the tape. Another method of accomplishing the same objective would be to have the video cassette decoder 211 actually read the external code, use the entire system code, and place the whole system code on the tape with the programming. Such a code would then be read by the microprocessor 22 when the programming is replayed through the receiver 10. This alternative is possible, although it might sightly lower the overall security of the total system.

It is specifically intended that the present invention not be specifically limited to the embodiments and illustrations contained herein, but embraces all such modified forms thereof as come within the scope of the following claims.

What is claimed is:

1. A television receiver adapted for use in a pay television system in which broadcast signals are scrambled comprising
    turner means for receiving the broadcast signal and for separating the broadcast signal into at least two components;
    a decoder circuit connected to receive a first one of the components from the tuner means;
    a mixer to combine the output of the decoder circuit with the first component of the output of the tuner means;
    a television screen and associated driver circuitry to display the output of the mixer;
    an electrically alterable memory module containing a first memory portion in which at least one pre-written external code is carried and a second memory portion in which program information may be entered;
    a microprocessor in the decoder circuit programmed to (1) read the external code from the memory module, (2) derive a broadcast code from the video signal, (3) generate a descrambling signal from the external code and output the descrambling signal to the mixer, and (4) to write information about programs actually being descrambled, as determined by the broadcast code, in the memory module so that use of the receiver to view scrambled broadcasts can be billed on a usage basis; and
    means for descrambling a second of the separated components of the broadcast signal from the tuner means separately from the other components so that full, descrambled composite video signal is not available at any one point in the receiver.

2. A television receiver as claimed in claim 1 wherein the tuner means includes a synch separator to separate a synch signal from the components video signal, wherein the separated synch signal is the second component, and wherein the descrambling means descrambles that synch signal independently of the composite video.

3. A television receiver adapted for use in a pay television system in which broadcast signals are scrambled comprising
    a tuner to receive the broadcast signal and derive a video signal therefrom;
    a decoder circuit connected to receive the video signal from the tuner,
    a mixer to combine the output of the decoder circuit with a first component of the output of the tuner;
    a television screen and associated driver circuitry to display the output of the mixer;
    an electrically alterable memory module containing a first memory portion in which at least one pre-written external code is carried and a second memory portion in which program information may be entered; and
    a microprocessor in the decoder circuit programmed to (1) read the external code from the memory module, (2) derive a broadcast code from the video signal, (3) recognize in the broadcast code whether the program signal is being received over the air or from a video cassette tape, (4) generate a descrambling signal from the external code, the descrambling signal being different depending on the source of the signal, and output the descrambling signal to the mixer, and (4) to write information about programs actually being descrambled, as determined by the broadcast code, in the memory module so that use of the receiver to view scrambled broadcasts can be billed on a usage basis and so that the receiver can descramble programming recorded on video cassette in partially descrambled format.

4. A television receiver adapted for use in a pay television system in which broadcast signals are scrambled comprising
    a tuner to receive the broadcast signal and derive a video signal therefrom;
    a decoder circuit connected to receive the video signal from the tuner;
    a mixer to combine the output of the decoder circuit with a component of the output of the tuner;
    a television screen and associated driver circuitry to display the output of the mixer;
    an electrically alterable memory module containing a first memory portion in which at least one pre-written external code is carried; and
    a microprocessor in the decoder circuit programmed to (1) read the external code from the memory module, (2) derive a broadcast code from the video signal, (3) recognize in the broadcast code whether the program signal is being received over the air or from a recorded media, and (4) generate a descrambling signal from the external code, the descrambling signal being different depending on the source of the signal, and (5) output the descrambling signal to the mixer, so that the user can view programs recorded on the recorded media in partially descrambled format.

* * * * *